(12) United States Patent
Kuroodi

(10) Patent No.: US 6,278,068 B1
(45) Date of Patent: Aug. 21, 2001

(54) INTEGRATED TECHNIQUE FOR FILTERING AND MEASURING SIGNALS OF FOUR AND FIVE WIRE DIGITIZERS

(75) Inventor: Vijendra Kuroodi, Cupertino, CA (US)

(73) Assignee: Tritech Microelectronics, Inc., Milpitas, CA (US)

( * ) Notice: Subject to any disclaimer, the term of this patent is extended or adjusted under 35 U.S.C. 154(b) by 0 days.

(21) Appl. No.: 09/037,132

(22) Filed: Mar. 9, 1998

(51) Int. Cl.[7] .................................................. G06K 11/16
(52) U.S. Cl. ........................................ 178/18.05; 345/174
(58) Field of Search ............................ 708/141; 345/174, 345/173, 156, 180, 177, 178, 179; 178/18.01, 18.08, 20.02, 19.01, 19.08

(56) References Cited

U.S. PATENT DOCUMENTS

| 4,306,110 | 12/1981 | Nelson et al. ........................ 178/18 |
| 4,484,026 | 11/1984 | Thornburg ............................ 178/18 |
| 5,041,701 | 8/1991 | Wolfe et al. .......................... 178/18 |
| 5,083,118 | 1/1992 | Kazama ............................... 340/706 |
| 5,191,175 | 3/1993 | Protheroe et al. ................... 178/18 |
| 5,225,636 | * 7/1993 | Protheroe ............................ 178/18 |
| 5,335,230 | * 8/1994 | Crooks et al. ....................... 714/48 |
| 5,365,253 | 11/1994 | Cheng et al. ....................... 345/156 |
| 5,563,381 | * 10/1996 | Crooks et al. ....................... 178/18 |
| 5,909,382 | * 6/1999 | Neoh ................................... 708/141 |

* cited by examiner

Primary Examiner—Steven Saras
Assistant Examiner—Uchendu Anyaso
(74) Attorney, Agent, or Firm—George O. Saile; Stephen B. Ackerman

(57) ABSTRACT

This invention describes a method and apparatus for filtering noise from a measurement of the X and Y coordinates of a resistive digitizer. The method applies to both four and five wire resistive digitizers biased with a DC voltage. The same filtering and measurement apparatus can be used on both types of digitizers with inclusion of an extra signal pin to accommodate the sense lead of the five wire digitizer. This approach involves connecting the signal to be read to a filter, reading the filtered voltage, and disconnecting the signal from the filter before disconnecting bias voltage from the planes of the digitizer. A separate filter is used for the X and Y coordinate signals and each filter voltage can be read at any time before the next measurement. A reset voltage is available to an established reference on the filter capacitor when a "pen up" status is detected.

15 Claims, 5 Drawing Sheets

INTEGRATED TECHNIQUE FOR FILTERING AND MEASURING SIGNALS OF FOUR AND FIVE WIRE DIGITIZERS

BACKGROUND OF THE INVENTION

1. Field of Invention

This invention relates to resistive digitizers and in particular noise filtration and coordinate voltage measurement for four and five wire digitizers.

2. Description of Related Art

Resistive digitizers when placed on an LCD or CRT screen pick up noise that is superimposed on the coordinate voltage that is to be read. This type of digitizer has two resistively coated surfaces that come into contact when pressed. The noise cannot be easily filtered because the different terminals are multi-function and see different voltages at different times. For example, in a four wire digitizer a terminal can be used to connect power to the digitizer panels or to read the coordinate voltage of the other panel. A filter one might use on a power terminal would have time constant implications when switching between functional use of the terminal, and a filter one might use in a signal voltage would have a voltage drop implication when used as a power terminal In U.S. Pat. No. 4,306,110 (Nelson et al.) is described an apparatus for determining planar coordinates. A four wire digitizer is discussed with the un-powered plane providing the location voltage through a high impedance conditioning circuit to a sample and hold circuit. As power is alternated between digitizer planes, un-powered plane is changed to read X-plane coordinate voltages and then Y-plane coordinate voltages. These voltages are connected to different inputs of the high impedance conditioning circuitry and further connected to sample and hold circuits at the output of the high impedance and conditioning circuits.

In U.S. Pat. No. 4,484,026 (Thornburg) a touch tablet is shown for entering data into a computer. The touch tablet is made of two resistive sheets in parallel and oriented orthogonal to each other. Conductive strips on two ends of each resistive sheet and having orthogonal orientation between sheets are electrically connected to the resistive material of the sheet. A voltage is applied between the strips on one resistive sheet, and a coordinate location is read from the un-powered sheet. By connecting the output amplifier to both strip on the un-powered resistive sheet, the sensitivity to noise is reduced and system performance is improved.

In U.S. Pat. No. 5,041,701 (Wolfe et al.) is described an edge linearization device for producing orthogonal electric fields in a resistive surface to be used in a contact input system. The system is capable of locating an object in contact with the resistive surface. In U.S. Pat. No. 5,083,118 (Kazama) is described a coordinate measuring apparatus to be mounted to a CRT or an LCD screen in which a fist layer is used as an electromagnetic screen and resistors of value approximately one hundred ohms are connected to one end of the resistive layers to help reduce noise. Shown in U.S. Pat. No. 5,191,175 (Protheroe et al.) is shown a self tuning digitizer control circuit in which a narrow bandpass filter is used to filter out extraneous noise picked up by a coordinate sensing stylus. In U.S. Pat. No. 5,365,253 (Cheng et al.) is shown a digitizer device with anti-noise capability. The digitizer operates at several hundred thousand Hertz and uses a hardware circuit controlled by a software program to eliminate outside noises.

Resistive digitizers have two resistively coated surfaces that come into contact when pressed. A standard four wire technique involves applying a voltage across one of the surfaces while reading the voltage at the point of contact through the other layer. A controller switches between the two resistive surfaces and measures the voltage corresponding to the X and Y coordinates. The noise induced into the resistive surfaces when the digitizer is placed on a CRT or an LCD screen can produce errors in the coordinate readings.

SUMMARY OF THE INVENTION

In this invention an R-C series filter is connected by a switch to the measurement terminal of a four or five wire resistive digitizer. Once the capacitor of the filter has been charged to the voltage value of the coordinate being measured, an ADC (analog to digital converter) measures the voltage across the capacitor and the switch disconnects the filter from the digitizer. The voltage is maintained on the capacitor until the next reading or until a reference voltage resets the capacitor voltage. Since the coordinate voltage is maintained on the filter capacitor after the switch disconnects the filter from the digitizer, the ADC could measure the voltage at anytime until the voltage is changed by a new measurement or a reset signal.

In a four wire digitizer a bias voltage is applied to first one resistive plane with the second plane floating, and then to a second plane with the first plane floating. When the bias voltage is applied to the X plane of the digitizer, the X coordinate location of the digitizer pen is measured by connecting the "Y–" terminal, or the "Y+" terminal, of the floating Y plane to an R-C filter. Either "Y" terminal can be used to measure the X coordinate voltage since the Y plane is floating when the X plane is powered. The X coordinate voltage is connected to the floating Y plane at the location of the digitizer pen. An ADC measures the X coordinate voltage across the capacitor with respect to the "X–" terminal of the X plane, and then the R-C filter is disconnected from the "Y–" terminal, or the "Y+" terminal. Since the X coordinate voltage is maintained on the R-C filter, the measurement of the X coordinate voltage by the ADC can be done after the R-C filter is disconnected from the terminal of the Y plane.

Next a voltage is applied to the Y plane of the digitizer, and the Y coordinate location of the digitizer pen is measured by connecting the "X–" terminal of the floating X plane to an R-C filter. Either "X" terminal can be used to measure the Y coordinate voltage since the X plane is floating when the Y plane is powered. The Y coordinate voltage is connected to the floating X plane at the location of the digitizer pen. An ADC measures the Y coordinate voltage across the capacitor of the filter with respect to the "Y–" terminal of the Y plane, and then the R-C filter is disconnected from the "X–" terminal. Since the Y coordinate voltage is maintained on the R-C filter, the measurement of the Y coordinate voltage by the ADC can be done after the R-C filter is disconnected from the terminal of the X plane.

The X and the Y filter voltages can be reset to a reference voltage to allow the capacitors of the filters to be charged from a known value. This is done at reset and initial powering of the digitizer controller, and when a pen up condition is detected. If there is adequate drive capability, the reference voltage can be connected directly to the capacitor of the filter; otherwise, the reference voltage is connected to the signal input of the filter.

In a five wire digitizer there is an X-Y voltage coordinate plane and a sense plane. Reference voltages are connected to the corners of the X-Y coordinate plane and are designated; UL upper left, LL lower left, UR upper right and LR lower right. To measure an X coordinate a first reference voltage is connected to UR and LR and a second reference voltage is connected to UL and LL. When a Y coordinate voltage is measured, the first reference voltage is connected to LL and LR and the second reference voltage is connected to UL and UR.

The sense plane of a five wire digitizer is floating with respect to the X-Y coordinate plane except when the digitizing pen forces contact between sense plane and the coordinate plane. At this point of contact the X or Y coordinate voltage is connected to the sense plane. A sense terminal of the sense plane is connected by means of a first switch to an R-C filter for X coordinate voltage values and by means of a second switch to an R-C filter for Y coordinate voltage values. The appropriate R-C filter is connected to the sense terminal by means of switches as the coordinate voltage plane is connected to voltages to measure the X coordinate and then the Y coordinate. The voltages to which each of the capacitors in the two filters were charged are maintained on the capacitors until the next coordinate measurement or until being reset by a reference voltage. The coordinate voltages can be read form the filters at any time after the filter is properly charged until the next coordinate measurement and a reset voltage is applied.

Filters other than R-C filters can be used with the four or five wire digitizers. The only requirements is that the filters sufficiently reduce the noise picked up by the digitizer and that resulting values the X and Y coordinate voltages be maintained long enough so the measurements can be made.

BRIEF DESCRIPTION OF THE DRAWINGS

This invention will be described with reference to the accompanying drawings, wherein.

DETAILED DESCRIPTION OF THE PREFERRED EMBODIMENT

Figure 1:
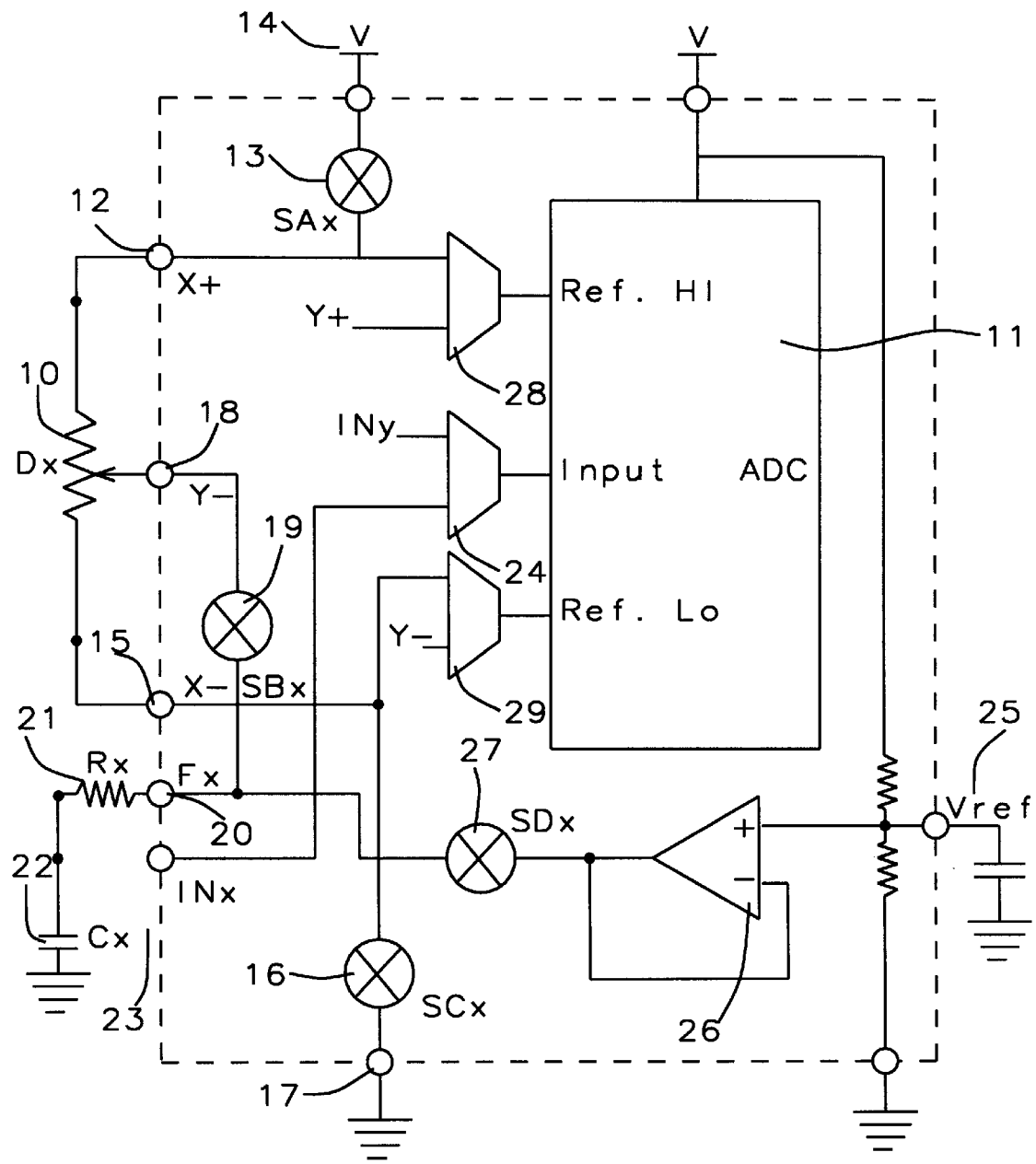
FIG. 1 is a schematic diagram of connections to the X plane of a four wire digitizer.

In FIG. 1 is shown a schematic of the connections of a four wire digitizer in which a resistive X plane Dx 10 is powered and the coordinate position is read from the floating Y plane of the digitizer by an ADC 11. Connected to the "X+" terminal 12 is a voltage V 14 through a switch SAx 13. Connected to the "X−" terminal 15 is circuit ground 17 through a switch SCx 16. The "Y−" terminal 18 of the floating Y plane is connected to a filter input Fx 20 through a switch SBx 19. Since the Y plane is floating, the "Y+" terminal could also be used to connect the signal on the Y plane to the filter input Fx 20 through switch SBx 19 or both the "Y+" and the "Y−" terminals could be connected the filter input Fx 20 through switch SBx 19. The filter consists of a resistor Rx 21 connected in series with a capacitor Cx 22. The filtered voltage on the capacitor Cx 22 is connected to the ADC 11 through a filtered voltage input terminal INx 23 and an analog selector 24. A reference voltage Vref 25 is connected to the filter Fx 20 through a voltage follower 26 and a switch SDx 27.

Continuing to refer to FIG. 1, power is connected to the X plane of the digitizer Dx 10 by closing switches SAx 13 and SCx 16. A voltage V 14 is connected by means of switch SAx 13 to the "X+" digitizer terminal 12 and the Ref. HI terminal of the ADC 11 through an analog selector 28. A ground voltage 17 is connected by means of switch SCx 16 to the "X−" digitizer terminal 15 and the Ref. LO terminal of the ADC 11 through an analog selector switch 29. A voltage representing the location of a pen contacting the planes of the digitizer is induced into the floating Y plane and is connected to the measurement circuitry through the "Y−" terminal 18. This voltage could also be connected through the "Y+" terminal. A switch SBx 19 is closed connecting the voltage on "Y−" 18 to the filter input Fx 20. After the filter capacitor Cx 22 is charged, the voltage across the capacitor is read by the ADC 11 and the switch SBx 19 is opened.

Continuing to refer to FIG. 1, the voltage on the filter capacitor Cx 22 is maintained until the next measurement of the X plane coordinate voltage. This can allow the voltage on the capacitor Cx 22 to be read any time after the capacitor Cx 22 is filly charged and until the next X plane measurement is initiated or a reset is initiated using a reference voltage Vref 25. A reference voltage Vref 25 can be connected to the filter input Fx 20 by momentarily closing switch SDx 27 to reset the capacitor Cx 22 to the reference voltage Vref 25 in preparation for the next reading of an X coordinate. If the voltage follower 26 has enough drive capability, the reference voltage could be momentarily connected to the capacitor Cx 22 of the X filter to reset the capacitor voltage.

Figure 2:
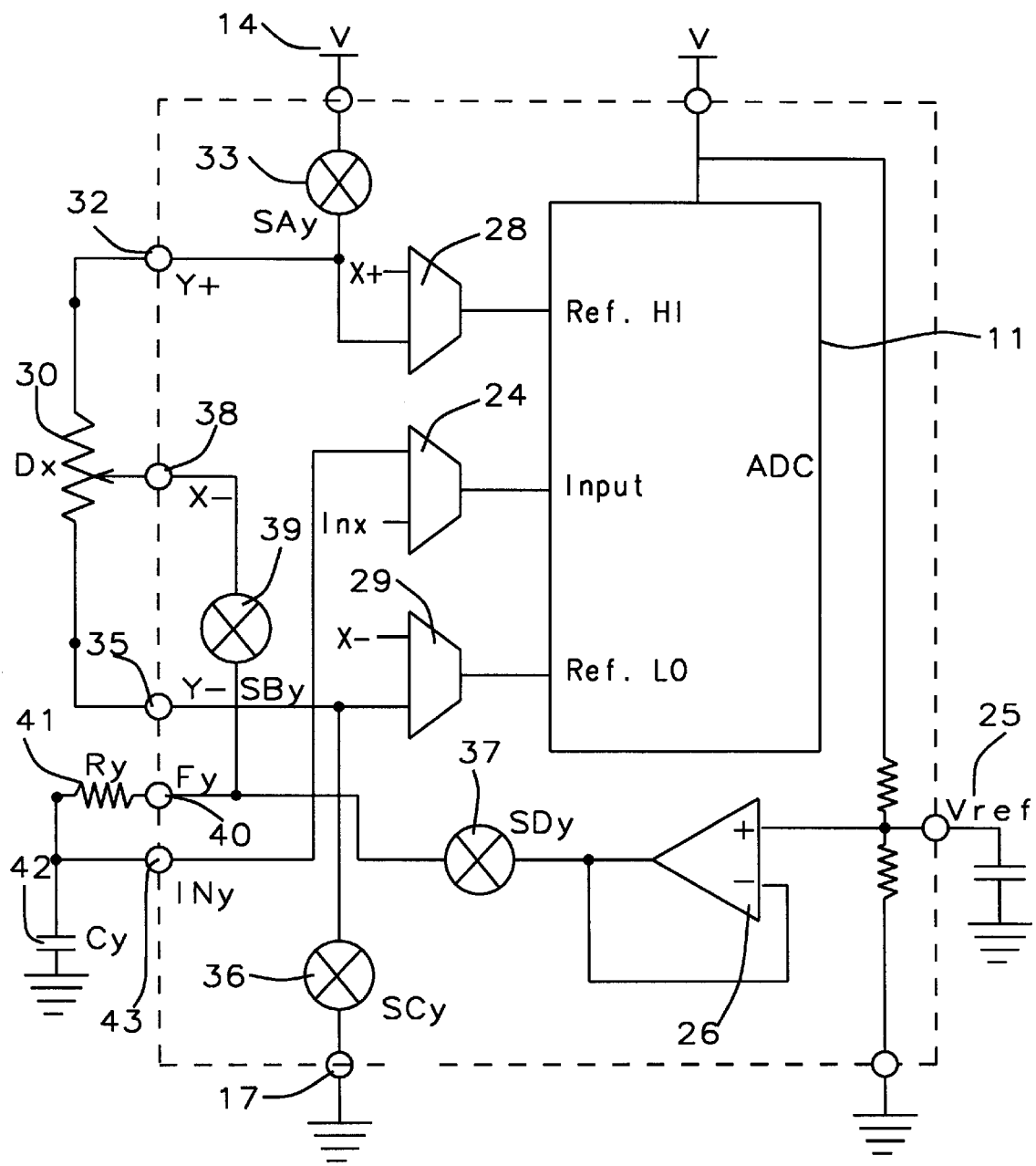
FIG. 2 is a schematic diagram of connections to the Y plane of a four wire digitizer.

In FIG. 2 is shown a schematic of the connections of a four wire digitizer in which a resistive Y plane Dy 30 is powered and the coordinate position is read from a floating X plane of the digitizer by an ADC 11. Connected to the "Y+" terminal 32 is a voltage V 14 through a switch SAy 33. Connected to the "Y−" terminal 35 is circuit ground 17 through a switch SCy 36. The "X−" terminal 38 of the floating X plane is connected to a filter input Fy 40 through a switch SBy 39. Since the X plane is floating, the "X+" terminal could also be used to connect the signal on the X plane to the filter input Fy 40 through switch SBy 39 or both the "X+" and the "X−" could be connected the filter input Fy 40 through switch SBy 39. The filter consists of a resistor Ry 41 connected in series with a capacitor Cy 42. The filtered voltage on the capacitor Cy 42 is connected to the ADC 11 through a filtered voltage input terminal INy 43 and an analog selector 24. A reference voltage Vref 25 is connected to the filter Fy 20 through a voltage follower 26 and a switch SDy 37.

Continuing to refer to FIG. 2, power is connected to the Y plane of the digitizer Dy 30 by closing switches SAy 33 and SCy 36. A voltage V 14 is connected by means of switch SAy 33 to the "Y+" digitizer terminal 32 and the Ref. HI terminal of the ADC 11 through an analog selector 28. A ground voltage 17 is connected by means of switch SCy 36 to the "Y−" digitizer terminal 35 and the Ref. LO terminal of the ADC 11 through an analog selector switch 29. A voltage representing the location of a pen contacting the planes of the digitizer is induced into the floating X plane and is connected to the measurement circuitry through the "X−" terminal 38. This voltage could also be connected through the "X+" terminal since the X plane is floating. A switch SBy 39 is closed connecting the voltage on "X−" terminal 38 to the filter input Fy 40. After the filter capacitor Cy 42 is charged, the voltage across the capacitor is read by the ADC 11 and the switch SBy 39 is opened.

Continuing to refer to FIG. 2, the voltage on the filter capacitor Cy 42 is maintained until the next measurement of the Y plane coordinate voltage. This can allow the voltage on the capacitor Cy 42 to be read any time after the capacitor Cy 42 is fully charged and until the next Y plane measurement is initiated or a reset is initiated using a reference voltage Vref 25. A reference voltage Vref 25 can be connected to the filter input Fy 40 by momentarily closing switch SDy 37 to reset the capacitor Cy 42 to the reference voltage Vref 25 in preparation for the next reading of an Y coordinate. If the voltage follower 26 has enough drive capability, the reference voltage could be momentarily connected to the capacitor Cy 42 of the Y filter to reset the capacitor voltage.

Figures 3A, 3B:
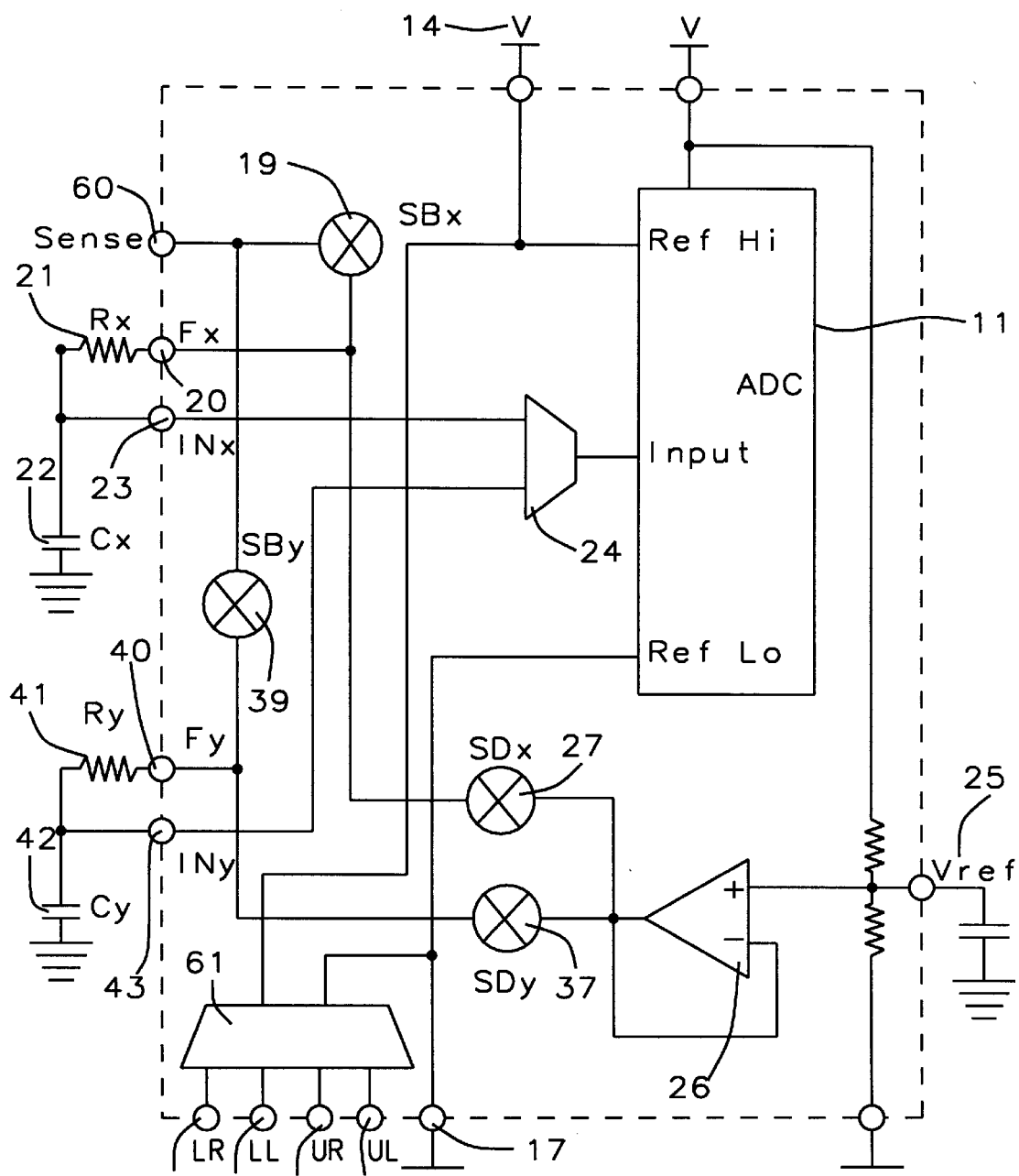
FIG. 3a is a schematic diagram of connections to a five wire digitizer.
FIG. 3b is a table showing the various voltage connections to the five wire digitizer panel.

Referring to FIG. 3a, connections to filter and read coordinate voltages for a five wire digitizer is shown The circuitry to filter and read the five wire digitizer is similar to that used with the four wire digitizer with the addition of a sense terminal 60, an analog selector 61 for delivering power the digitizer panel, and the renaming of the terminals connecting power to the five wire digitizer to lower right LR 62, lower left LL 63, upper right UR 64 and upper left UL 65. In a five wire digitizer there is a sense plane and a resistive coordinate plane. The resistive coordinate plane is powered from the corners with the upper left being the "0,0" coordinate. A sense terminal 60 is connected to the sense plane of the five wire digitizer which in turn is connected to a filter input Fx 20 through a switch SBx 19 and to a filter input Fy 40 through switch SBy 39. The filter for filtering X coordinate voltages consists of a resistor Rx 21 connected in series with a capacitor Cx 22 to circuit ground The filtered voltage on the capacitor Cx 22 is connected to the ADC 11 through INx 23 and an analog selector 24. The filter for filtering Y coordinate voltages consists of a resistor Ry 41 connected in series with a capacitor Cy 42 to circuit ground. The filtered voltage on the capacitor Cy 42 is connected to the ADC 11 through INy 43 and an analog selector 24. A reference voltage Vref 25 is connected to the input of the X filter Fx 20 through a voltage follower 26 and a switch SDx 27, and to the input of the Y filter Fy 40 through a voltage follower 26 and a switch SDy 37.

Continuing to refer to FIG. 3a, when an X coordinate voltage is being measured, the analog selector 61 connects a voltage V 14 to the LR terminal 62 and the UR terminal 64, and ground to the LL terminal 63 and the UL terminal 65. The sense terminal 60 connected to the sense plane has an X coordinate voltage that is connected to the X filter input Fx 20 by means of a switch SBx 19. The X filter consists of a resistor Rx 21 and a capacitor Cx 22. After the capacitor Cx 22 has been charged with the X coordinate voltage, the voltage on the capacitor Cx 22 is read by the ADC 11 through terminal INx 23 and an analog selector 24. After the ADC 11 reads the voltage on capacitor Cx 22, the switch SBx 19 is opened. The voltage on capacitor Cx 22 can be reset to the reference voltage Vref 25 by momentarily closing switch SDx 27. If the capacitor voltage is not reset, then the X coordinate voltage is maintained on the capacitor Cx 22 until the next X coordinate measurement; therefore an X coordinate measurement by the ADC 11 could be made anytime before the next X coordinate measurement or a reset of the capacitor voltage by the reference voltage Vref 25 through the voltage follower 26 and switch SDx 27.

Continuing to refer to FIG. 3a, when a Y coordinate voltage is being measured, the analog selector 61 connects a voltage V 14 to the LR terminal 62 and the LL terminal 63, and ground to the UR terminal 64 and the UL terminal 65. The sense terminal 60 connected to the sense plane has a Y coordinate voltage that is connected to the Y filter input Fy 40 by means of a switch SBy 39. The X filter consists of a resistor Ry 41 and a capacitor Cy 42. After the capacitor Cy 42 has been charged with the Y coordinate voltage, the voltage on the capacitor Cy 42 is read by the ADC 11 through terminal INy 43 and an analog selector 24. After the ADC 11 reads the voltage on capacitor Cy 42, the switch SBy 39 is opened, and the voltage on capacitor Cy 42 can be reset to the reference voltage Vref 25 by momentarily closing switch SDy 37. If the capacitor voltage is not reset, then the Y coordinate voltage is maintained on the capacitor Cy 42 until the next Y coordinate measurement; therefore a Y coordinate measurement by the ADC 11 could be made anytime before the next Y coordinate measurement or a reset of the capacitor voltage by the reference voltage Vref 25 through the voltage follower 26 and switch SDy 37. When a Y coordinate voltage is on the sense terminal 60, switch SBy 62 is closed and SBx 61 is open. The Y coordinate voltage is connected to the input of the Y filter Fy 67. After the capacitor Cy 69 has been charged with the Y coordinate voltage, the voltage on the capacitor Cy 69 is read by the ADC 72 through terminal INy 70 and the analog selector 71. The voltage on capacitor Cy 69 can be reset to the reference voltage Vref 73 by momentarily closing switch SDy 76.

In FIG. 3b a table is shown that has the various voltages to be connected to the resistive coordinate plane of a five wire digitizer. The voltages are connected to the four corners of the five wire digitizer as noted by LR (upper left), LL (lower left), UR (upper right) and UL (upper left). When measuring an X coordinate, the LR and UR corners are connected to a voltage V, and the LL and UL corners are connected to ground G. When measuring a Y coordinate, the LR and LL corners are connected to a voltage V, and the UR and UL corners are connected to ground G. For touch detection, TD, all corners are connected to a voltage V.

Figure 4:
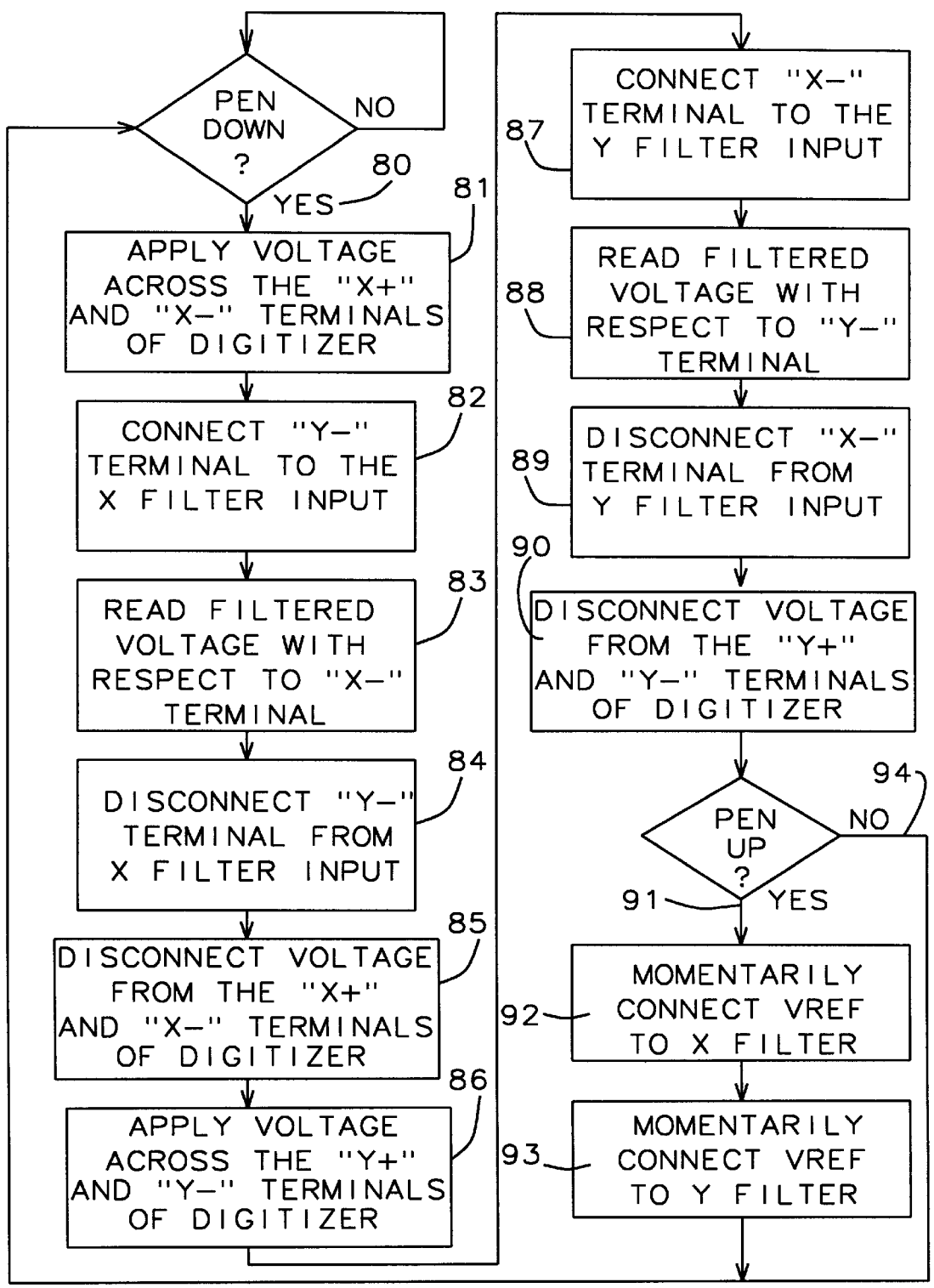
FIG. 4 is a flow diagram of a method to filter and read coordinate voltages for a four wire digitizer.

Shown in FIG. 4 is a method for filtering coordinate voltages using a four terminal digitizer. When a pen is detected in the down position 80, a voltage is applied across the "X+" and "X−" terminals of the digitizer 81. The the word "down" as used in the previous sentence implies contact of the pen with the digitizer regardless of the orientation of the digitizer. Next the "Y−" terminal is connected to the X filter input 82. The Y panel of the digitizer is not powered and is floating with respect to voltage bias. The voltage representing the position of a digitizing pen is superimposed on the Y plane at the point of contact with the pen. The filtered voltage across the filter capacitor is read by an ADC with respect to the "X−" terminal 83 which is ground after the capacitor is fully charged. After the filtered voltage is read, the "Y−" terminal is disconnected from the X filter input 84. Then the bias voltage is disconnected from the "X+" and the "X−" terminals 85 and a voltage bias is applied across the "Y+" and "Y−" terminals of the digitizer 86. The "X−" terminal, which is now floating with respect to applied power, is now connected to the Y filter input 87, and the voltage representing the Y location of the pen is superimposed onto the floating X plane. When the capacitor of the Y filter is charged up with the Y coordinate voltage from the floating X plane, the voltage on the capacitor is read with respect to the "Y−" terminal of the digitizer 88. The "X−" terminal is disconnected for the Y filter 89, and the bias voltage is disconnected from the "Y+" and "Y−" terminals of the digitizer 90. When the pen is detected in the up position (up meaning not in contact with the digitizer panels) 91, Vref is momentarily connected to the X filter 92 to establish the same starting voltage on the X filter capacitor for the next measurement. Next Vref is momentarily connected to the Y filter 93 to establish a starting voltage on the Y filter capacitor, and the process returns to the beginning step waiting for the pen to be down in contact with the digitizer 80. If the pen is not up 94, the process continues with a return to the beginning step, and since the pen is down 80 continues on to applying a voltage across the X terminals of the digitizer 81. It should be noted that all steps in the process may take varying time delays for voltages and signals to stabilize. Adequate time delays are assumed to exist in each of the steps of the process.

Figure 5:
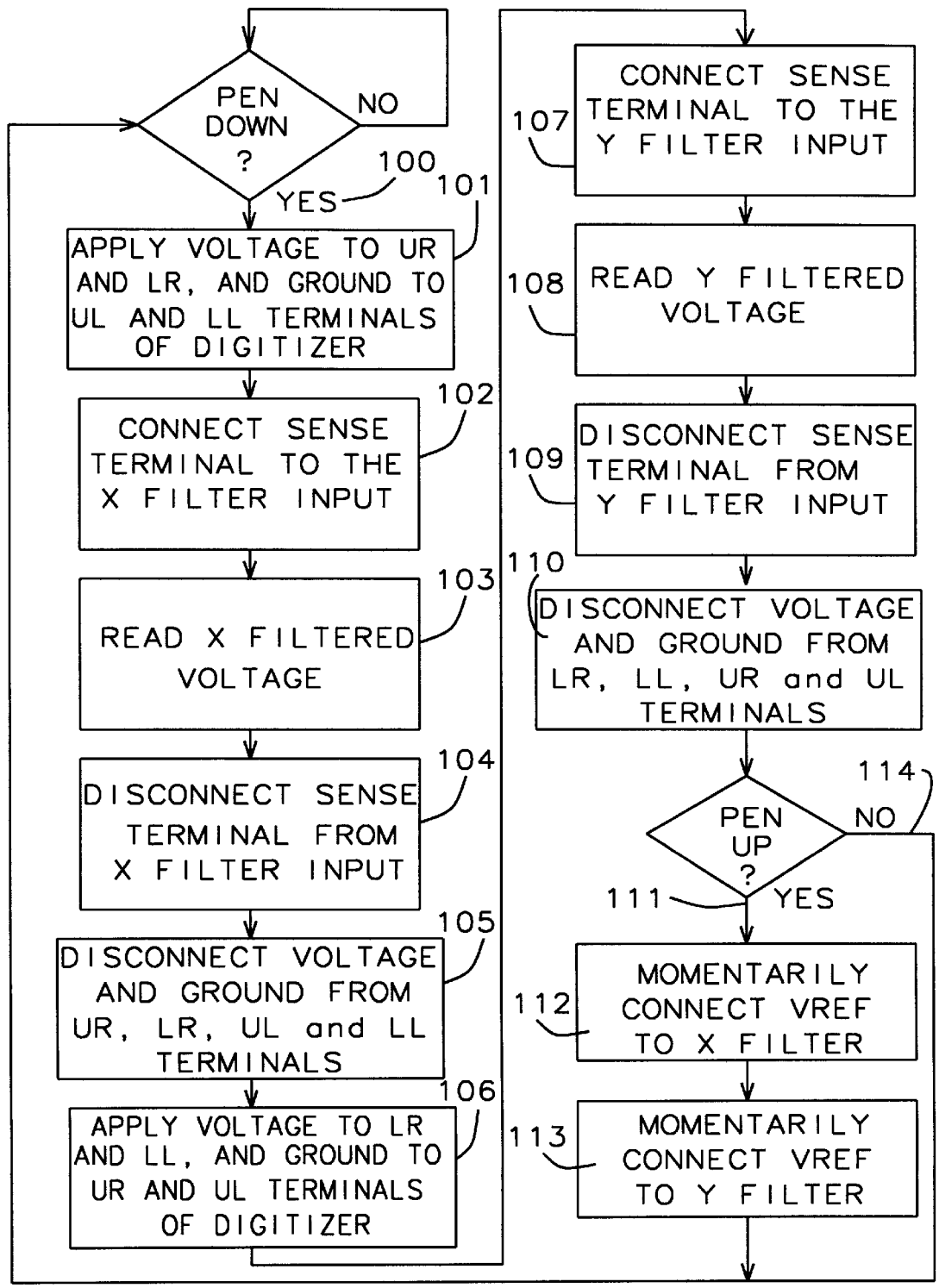
FIG. 5 is a flow diagram of a method to filter and read coordinate voltages for a five wire digitizer.

Shown in FIG. 5 is a method for filtering coordinate voltages using a five terminal digitizer. When a pen is detected in the down position 100, a voltage is connected to the UR (upper right) and LR (lower left), and ground is connected to UL (upper left) and LL (lower left) terminals of the digitizer 101. The the word "down" as used here implies contact of the pen with the digitizer regardless of the orientation of the digitizer. Next a sense terminal is connected to the X filter input 102. The filtered voltage across the filter capacitor is read by an ADC with respect ground 103. After the filtered voltage is read, the sense terminal is disconnected from the X filter input 104. Then the bias voltage and ground is disconnected from the Up, LR, UL and LL terminals 105 and a voltage bias is connected to LR and LL and ground is connected to UR and UL terminals of the digitizer 106. Next a sense terminal is connected to the Y filter input 107. When the capacitor of the Y filter is charged up with the Y coordinate voltage, the voltage on the capacitor is read with respect to ground 108. The sense terminal is then disconnected from the Y filter 109, and the bias voltage and ground is disconnected from LR, LL, UR and UL terminals of the digitizer 110. When the pen is detected in the up position (up meaning not in contact with the digitizer panels) 111, Vref is momentarily connected to the X filter 112 to establish the same starting voltage on the X filter capacitor for the next measurement. Next Vref is momentarily connected to the Y filter 113 to establish a starting voltage on the Y filter capacitor, and the process returns to the beginning step waiting for the pen to be down in contact with the digitizer 100. If the pen is not up 114, the process continues with a return to the beginning step, and since the pen is down 100, the process continues by applying a voltage across the X terminals of the digitizer 81. It should be noted that all steps in the process may take varying time delays for voltages and signals to stabilize. Adequate time delays are assumed to exist in each of the steps of the process.

While the invention has been particularly shown and described with reference to preferred embodiments thereof, it will be understood by those skilled in the art that various changes in form and details may be made without departing from the spirit and scope of the invention.

What is claimed is:

1. A method for filtering X and Y coordinate signals of a resistive digitizer, comprising:
   a) connecting power to a first coordinate plane of a resistive digitizer,
   b) connecting a first sense signal to a first filter input by closing a first switch and producing a first filtered signal,
   c) reading said first filtered signal,
   d) disconnecting said first sense signal from said first filter input by opening said first switch,
   e) disconnecting power from said first coordinate plane,
   f) connecting power to a second coordinate plane of said resistive digitizer,
   g) connecting a second sense signal to a second filter input by closing a second switch and producing a second filtered signal,
   h) reading said second filter signal,
   i) disconnecting said second sense signal from said second filter input by opening said second switch,
   j) disconnecting power from said second coordinate plane.

2. The method of claim 1, wherein said digitizer can be either a four or five wire resistive digitizer, and the five wire digitizer can have one coordinate plane wherein a first coordinate direction is used in place of the first coordinate plane and a second coordinate direction is used in place of the second coordinate plane.

3. The method of claim 1, wherein said first filtered signal is maintained by said first filter after said first sense signal is disconnected from said first filter input, and said second filtered signal is maintained by said second filter after said second sense signal is disconnected from said second filter input, allowing the first filtered signal to be measured at any time before a next signal is connected to said first filter, and allowing the second filtered signal to be measured at any time before a next signal is connected to said second filter.

4. The method of claim 1, wherein predictability of the signals can be enhanced by resetting the first filtered signal and the second filtered signal to a predetermined voltage upon detecting a digitizer pen in a position not in contact with the first and second coordinate planes to allow the next filtered signal to have a more predictable time to reach full value.

5. A method for filtering X and Y coordinate signals for a four wire resistive digitizer, comprising:
   a) applying a bias voltage to an "X+" and an "X−" terminal of an X plane of a digitizer,
   b) connecting a "Y−" terminal to an X filter input to produce a first filtered voltage proportional to an X coordinate location of a locating pen,
   c) reading said first filtered voltage with respect to the "X−" terminal,
   d) disconnecting said "Y−" terminal from said X filter input and maintaining said first filtered voltage on said X filter,
   e) disconnecting said bias voltage from the "X+" and the "X−" voltage terminals of the X plane of said digitizer,
   f) applying said bias voltage to a "Y+" and a "Y−" terminal of a Y plane of a digitizer,
   g) connecting an "X−" terminal to a Y filter input to produce a second filtered voltage proportional to a Y coordinate location of a locating pen,
   h) reading said second filtered voltage with respect to the "Y−" terminal,
   i) disconnecting said "X−" terminal from said Y filter input and maintaining said second filtered voltage on said Y filter,
   j) disconnecting said bias voltage from the "Y+" and the "Y−" voltage terminals of the Y plane of said digitizer,
   k) repeating process steps from beginning.

6. The method of claim 5, wherein said first filtered voltage is maintained by said X filter after said "Y−" terminal is disconnected from said X filter input, and said second filtered voltage is maintained by said Y filter after said "X−" terminal is disconnected from said Y filter input, allowing the first filtered voltage to be measured at any time before a next signal is connected to said X filter, and allowing the second filtered signal to be measured at any time before a next signal is connected to said Y filter.

7. The method of claim 5, wherein repeatability of the signals can enhanced by resetting the first filtered voltage and the second filtered voltage to a reference voltage upon detecting a digitizer pen in a position not in contact with the first and second coordinate planes to allow the next filtered signal to have a more predictable time to reach full value.

8. A method for filtering X and Y coordinate signals for a five wire resistive digitizer, comprising:
   a) applying a bias voltage to UR and LR terminals and ground to UL and LL terminals of a five wire digitizer,
   b) connecting a sense terminal to an X filter input to produce a first filtered voltage proportional to an X coordinate location of a locating pen,
   c) reading said first filtered voltage representing the X coordinate location with respect to circuit ground,
   d) disconnecting said sense terminal from said X filter input and maintaining said first filtered voltage until a next reading of said X coordinate location,
   e) disconnecting said bias voltage from UR and LR, and ground from UL and LL terminals of said digitizer,
   f) applying said bias voltage to LR and LL, and ground to UR and UL to terminals of a five wire digitizer digitizer,
   g) connecting said sense terminal to a Y filter input to produce a second filtered voltage proportional to a Y coordinate location of a locating pen,
   h) reading said second filtered voltage representing the Y coordinate location with respect to circuit ground,
   i) disconnecting said sense terminal from said Y filter input and maintaining said second filtered voltage until a next reading of said Y coordinate location,
   j) disconnecting said bias voltage from LR and LL, and ground from UR and UL terminals of said digitizer,
   k) repeating process steps from beginning.

9. The method of claim 8, wherein said first filtered voltage is maintained by said X filter after said sense terminal is disconnected from said X filter input, and said second filtered voltage is maintained by said Y filter after said sense terminal is disconnected from said Y filter input, allowing the first filtered voltage to be measured at any time before a next signal is connected to said X filter, and allowing the second filtered signal to be measured at any time before a next signal is connected to said Y filter.

10. The method of claim 8, wherein repeatability of the signals can be enhanced by resetting the first filtered voltage and the second filtered voltage to a reference voltage upon detecting a digitizer pen in a position not in contact with the first and second coordinate planes to allow the next filtered signal to have a more predictable time to reach full value.

11. A circuit for filtering X and Y coordinate analog signals of a four wire digitizer, comprising:
   a) an "X+" terminal of a four wire digitizer connected to positive bias by a first switch,
   b) an "X−" terminal of the four wire digitizer connected to circuit ground by a second switch,
   c) a "Y−" terminal of the four wire digitizer connected to an X filter by a third switch,
   d) a reference voltage connected to said X filter by a fourth switch,
   e) said X filter being an Rx resistor connected in series with a Cx capacitor that is connected to ground,
   f) an input to an analog to digital converter connected to said Cx capacitor through an analog selector circuit,
   g) said Cx capacitor providing a first filtered voltage representing an X coordinate and said Cx capacitor maintaining said first filtered voltage between measurements of said X coordinate,
   h) a "Y+" terminal of the four wire digitizer connected to positive bias by a fifth switch,
   i) said "Y−" terminal of the four wire digitizer connected to circuit ground by a sixth switch,
   j) said "X−" terminal of the four wire digitizer connected to a Y filter by a seventh switch,
   k) said reference voltage connected to said Y filter by an eighth switch,
   l) said Y filter being an Ry resistor connected in series with a Cy capacitor that is connected to ground,
   m) said input to said analog to digital converter connected to said Cy capacitor through said analog selector circuit,
   n) said Cy capacitor providing a second filtered voltage representing a Y coordinate and said Cy capacitor maintaining said second filtered voltage between measurements of said Y coordinate.

12. The circuit of claim 11, wherein the "Y−" terminal of a floating Y plane is used to measure the X coordinate of a pen of the digitizer and the "X−" terminal of a floating X plane is used to measure the Y coordinate of the pen of the digitizer.

13. The circuit of claim 11, wherein the reference voltage is connected to the X filter to precondition the Cx capacitor before a signal from the "Y−" terminal is connected to the X filter, and the reference voltage is connected to the Y filter to precondition the Cy capacitor before a signal from the "X−" terminal is connected to the Y filter.

14. A circuit for filtering X and Y coordinate analog signals five wire digitizer, comprising:
   a) an X coordinate sense signal connected to an X filter by a first switch,
   b) a Y coordinate sense signal connected to a Y filter by a second switch,
   c) a reference voltage connected to said X filter by a third switch,
   d) a reference voltage connected to said Y filter by a fourth switch,
   e) said X filter being an Rx resistor connected in series with a Cx capacitor that is connected to ground,
   f) an input to an analog to digital converter connected to said Cx capacitor through an analog selector circuit,
   g) said Cx capacitor maintaining a filtered voltage representing an X coordinate pen location until a next measurement of said X coordinate pen location,
   h) said Y filter being an Ry resistor connected in series with a Cy capacitor that is connected to ground,
   i) said input to said analog to digital converter connected to said Cy capacitor through said analog selector circuit,
   j) said Cy capacitor maintaining a filtered voltage representing a Y coordinate pen location until a next measurement of said Y coordinate pen location.

15. The circuit of claim 14, wherein said third switch is momentarily closed prior to closing the first switch to precondition the Cx capacitor of the X filter, and said fourth switch is momentarily closed prior to closing the second switch to precondition the Cy capacitor of the Y filter.

* * * * *